US010769915B2

(12) United States Patent
Wang

(10) Patent No.: US 10,769,915 B2
(45) Date of Patent: Sep. 8, 2020

(54) PRIVACY PRESERVING CAMERA

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 79 days.

(21) Appl. No.: 16/236,987

(22) Filed: Dec. 31, 2018

(65) Prior Publication Data

US 2020/0211348 A1 Jul. 2, 2020

(51) Int. Cl.
*G08B 13/19* (2006.01)
*G08B 13/196* (2006.01)
*G06K 9/00* (2006.01)
*H04N 5/232* (2006.01)

(52) U.S. Cl.
CPC ... *G08B 13/19686* (2013.01); *G06K 9/00228* (2013.01); *G06K 9/00771* (2013.01); *H04N 5/23222* (2013.01)

(58) Field of Classification Search
CPC ......... G08B 13/19686; H04N 5/23222; G06K 9/00771; G06K 9/00228
See application file for complete search history.

(56) References Cited

U.S. PATENT DOCUMENTS

| 2014/0023248 A1* | 1/2014 | Yoo ..................... G06K 9/00288 382/118 |
| 2016/0196350 A1* | 7/2016 | Mau ........................ G06F 16/951 707/706 |
| 2017/0353423 A1* | 12/2017 | Morrison .............. G06F 16/951 |
| 2018/0157939 A1* | 6/2018 | Butt ..................... G06N 3/0454 |

OTHER PUBLICATIONS

Lee et al., "Detecting Nakedness in Color Images", Studies in Computational Intelligence, vol. 282, ISBN 978-3-642-11754-1, pp. 225-236 (Year: 2010).*
Kaiming He et al., "Mask R-CNN", Facebook AI Research (FAIR), arXiv:1703.06870v3 [cs.CV] Jan. 24, 2018, pp. 1-12.
Alasdair Newson et al., "Video Inpainting of Complex Scenes", http://arxiv.org/abs/1503.05528v2, pp. 1-27.

(Continued)

*Primary Examiner* — Qian Yang
(74) *Attorney, Agent, or Firm* — Anova Law Group, PLLC

(57) ABSTRACT

A privacy reserving camera including a frame buffer, an object detection and tracking module, an object identification module, an instance segmentation module and an object removal and inpainting module. The frame buffer stores frames of a video stream captured by the privacy preserving camera. The object detection and tracking module detects a moving object in the video stream. The object identification module determines whether the moving object is a privacy protecting object. The instance segmentation module parses the moving object in the video stream. The object removal and inpainting module removes at least a portion of the moving object from the video stream, fills an area of the removed moving object in the video stream with a compensated patch from a neighbor frame of the video stream, and outputs a modified video stream having at least a portion of the moving object replaced with the compensated patch.

17 Claims, 3 Drawing Sheets

(56) References Cited

OTHER PUBLICATIONS

Jia-Bin Huang et al., "Temporally Coherent Completion of Dynamic Video", ACM Trans. Graph. 35, 6, Article 196 (Nov. 2016), 11 pages. DOI=10.1145/2980179.2982398, http://doi.acm.org/10.1145/2980179.2982398, pp. 1-11.

Thuc Le et al., "Motion-Consistent Video Inpainting", ICIP 2017: IEEE International Conference on Image Processing, Sep. 2017, Beijing,China. ICIP 2017: IEEE International Conference on Image Processing, ICIP 2017: IEEE International, Conference on Image Processing. <http://2017.ieeeicip.org/>. <hal-01492536>, https://hal.archives-ouvertes.fr/hal-01492536, Mar. 20, 2017, pp. 1-6.

Guanghan Ning et al., "Spatially Supervised Recurrent Convolutional Neural Networks for Visual Object Tracking", Department of Electrical and Computer Engineering University of Missouri, Columbia, MO 65201. arXiv:1607.05781v1 [cs.CV] Jul. 19, 2016. Xiaobo Ren et al., TCL Research America, pp. 1-10.

Michael Lliadis et al., "Robust and Low-Rank Representation for Fast Face Identification with Occlusions", arXiv:1605.02266v2 [cs.CV] Nov. 11, 2017, pp. 1-16.

Liang Peng et al., "Highly Accurate Video Object Identification Utilizing Hint Information", Department of Computer Science, Utah State University, School of Computing and Information Sciences, Florida International University, TCL Research America, pp. 1-5.

Douglas Chai et al.,"Face Segmentation Using Skin-Color Map in Videophone Applications", IEEE Transactions on Circuits and Systems for Video Technology, vol. 9, No. 4, Jun. 1999, p. 551-564.

Erin Griffiths et al, "Privacy-preserving Image Processing with Binocular Thermal Cameras", University of Virginia, USA,Proceedings of the ACM on Interactive, Mobile, Wearable and Ubiquitous Technologies, vol. 1, No. 4, Article 133. Publication date: Dec. 2017, https://doi.org/10.1145/3161198, pp. 133-133.25.

Jinyuan Zhao et al., "Privacy-Preserving Indoor Localization via Active Scene Illumination", Department of Electrical and Computer Engineering, Boston University, pp. 1693-1702.

Fausto C. Fleites et al., "Enhancing Product Detection With Multicue Optimization for TV Shopping Applications", School of Computing and Information Sciences, Florida International University, Miami, FL 33174 USA, General Manager of TCL Research America, Santa Clara, CA 95134 USA, revised Dec. 8, 2014; accepted Dec. 14, 2014. Date of publication Jan. 7, 2015; date of current version Jun. 10, 2015. Digital Object Identifer 10.1109/TETC2014.2386140, vol. 3, No. 2, Jun. 2015, pp. 161-171.

Joseph Redmon et al., "You Only Look Once: Unified, Real-Time Object Detection", University of Washington, Allen Institute for AI, Facebook AI Research,http://pjreddie.com/yolo/, pp. 779-788.

* cited by examiner

PRIVACY PRESERVING CAMERA

FIELD OF THE DISCLOSURE

The present disclosure relates to the field of video recording and processing technologies and, more particularly, relates to techniques for privacy preserving camera systems and a privacy preserving method by using the camera system.

BACKGROUND

The application of the indoor cameras equipped in smart homes are popular consumer choices. These cameras are used for monitoring babies, guarding the security of doorways, protecting the safety of stove/grills, assisting elders, and for many other functional applications and use scenarios. However, a major concern for the application of the indoor cameras is privacy protection as the output video includes detailed visual data that may contain private information (e.g., unclothed human body). Obviously, to provide more security, an application requires more detailed information from the video data; while to protect privacy, the same application needs to mask certain information in the video data. Therefore, a video monitoring system needs to balance the needs of security requirements and the needs of the privacy requirements.

There are several applications developed to balance such conflicting needs. For example, a small network of extremely low-resolution color sensors is adopted to replace the high-resolution video camera. In another example, only extreme low-resolution videos are used to preserve privacy, which are suitable for certain activity classifications. In such system with heightened privacy preservation in the system designs, however, the loss of detailed information makes many security applications infeasible.

BRIEF SUMMARY OF THE DISCLOSURE

One aspect of the present disclosure provides a privacy reserving camera including a frame buffer, an object detection and tracking module, an object identification module, an instance segmentation module and an object removal and inpainting module. The frame buffer stores frames of a video stream captured by the privacy preserving camera; the object detection and tracking module detects a moving object in the video stream; the object identification module determines whether the moving object is a privacy protecting object, wherein when the moving object is determined not to be the privacy protecting object, the video stream is output to a user; the instance segmentation module parses the moving object in the video stream when the moving object is determined by the object identification module as the privacy protecting object; the object removal and inpainting module removes at least a portion of the moving object from the video stream, fills an area of the removed moving object in the video stream with a compensated patch from a neighbor frame or a background of a current frame of the video stream, and outputs a modified video stream having at least a portion of the moving object replaced with the compensated patch.

Another aspect of the present disclosure provides a method for privacy preserving. A video stream captured by a camera is obtained and frames of the video stream is stored in a frame buffer. A moving object in the video stream is detected, and then whether the moving object is a privacy protecting object is determined. When the moving object is determined not to be the privacy protecting object, the video stream is outputted. When the moving object is determined as the privacy protecting object, the method includes further steps that a skin area detection is performed to the moving object to determine a nakedness level of the moving object, the moving object in the video stream is parsed, at least a portion of the moving object is removed from the video stream, an area of the removed moving object in the video stream is filled with a compensated patch from a neighbor frame or a background of a current frame of the video stream, and a modified video stream having at least a portion of the moving object replaced with the compensated patch is outputted.

Another aspect of the present disclosure provides a non-transitory computer readable medium storing executable computer program instructions for privacy preserving. A video stream captured by a camera is obtained and frames of the video stream is stored in a frame buffer. A moving object in the video stream is detected, and then whether the moving object is a privacy protecting object is determined. When the moving object is determined not to be the privacy protecting object, the video stream is outputted. When the moving object is determined as the privacy protecting object, the method includes further steps that a skin area detection is performed to the moving object to determine a nakedness level of the moving object, the moving object in the video stream is parsed, at least a portion of the moving object is removed from the video stream, an area of the removed moving object in the video stream is filled with a compensated patch from a neighbor frame or a background of a current frame of the video stream, and a modified video stream having at least a portion of the moving object replaced with the compensated patch is outputted.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides a video camera application that enables privacy preservation, which is particularly useful for indoor usage scenarios, where the privacy is very critical for home owners. It is important to realize that security and privacy are two factors that need to balance in the indoor camera applications, where security concerns require to expose as much information as possible to detect possible intruders, while privacy concerns require to hide sensitive information from disclosing which may cause useful cues overlooked from security point of view.

The present disclosure proposes a solution to support both security and privacy of a video monitoring system. By utilizing a customizable deferred output, the system is able to check all moving objects and remove the ones that violate privacy policies while keeping the ones (or partial ones) that maybe useful for security monitoring. In the present disclosure, an object visibility decision mechanism is applied in the system, after the output of image pipeline, to hide the privacy-sensitive objects and keep the objects that important for security/monitoring goals.

Figure 1:
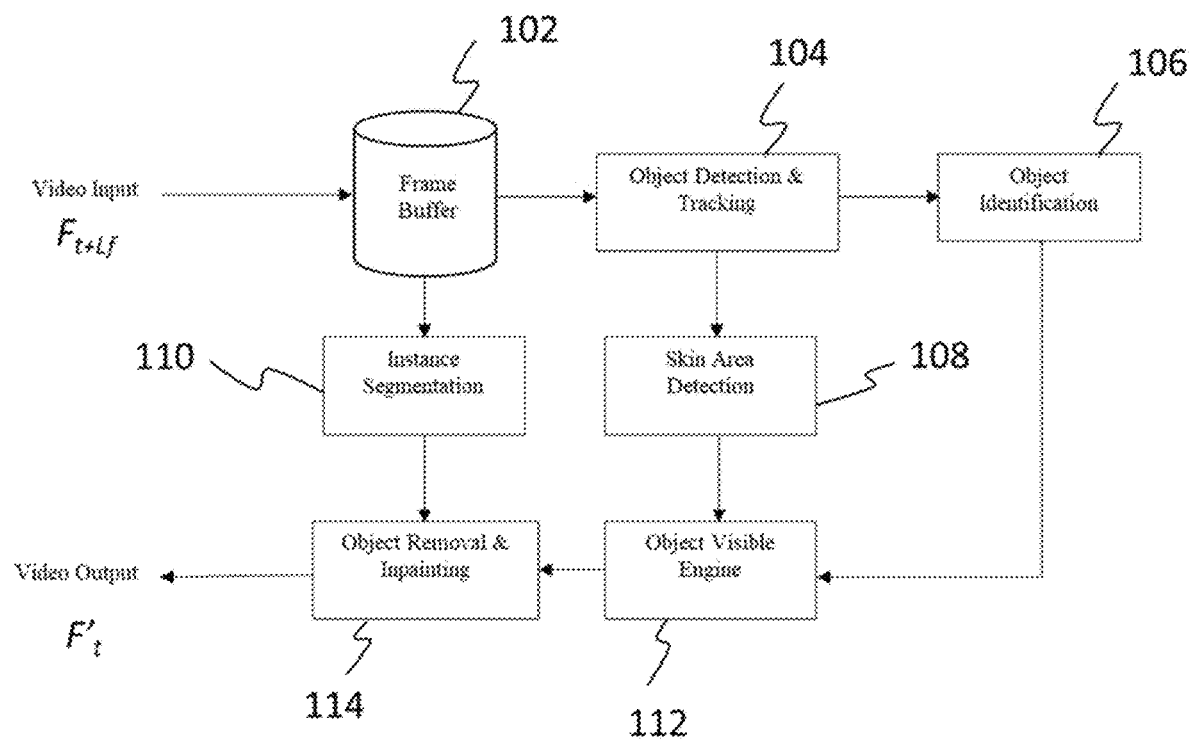
FIG. 1 illustrates an exemplary system architecture consistent with various disclosed embodiments.

FIG. 1 illustrates an exemplary system architecture consistent with various disclosed embodiments. As shown in FIG. 1, the present disclosure provides a privacy reserving camera system including a frame buffer 102, an object detection and tracking module 104, an object identification module 106, a skin area detection module 108, an instance segmentation module 110, an object removal and inpainting module 114, and an object visible engine 112.

In the present disclosure, a module refers to computer program logic utilized to provide the specified functionality. Thus, a module may be implemented in hardware, firmware, and/or software. In some embodiments, program modules are stored on the storage device, loaded into the memory, and executed by the processor. When executed by one or more processors, a functional module implements the functions described in the embodiments of the present disclosure.

In the present disclosure, the system is specifically designed for the privacy-preserving purposes. As shown in FIG. 1, the input video stream captured by the camera, after the image processing pipeline, may enter the frame buffer 102, which enables the processing of the video frames, based on the history frames up to the size of the buffer, and may enable a delayed output video streams with internal processing along the modules shown in FIG. 1. The frame buffer 102 may enable a latency L, which allows the system to use this latency L to make a decision on every moving object and determines its classification for handling. The latency L between video input and video output in seconds. When denoting the size of the frame buffer 102 in frames is B, and the frame rate per second is f, we may find:

$$B >= L*f, \quad (1)$$

where B is a system constraint, while L is a customizable variable set by user. It is expected to control both B and L in a reasonable small value, however, the larger L enables better accuracy of the system, as the object detection and tracking module 104 and the object identification module 106 have a longer sliding window to process the potential moving objects.

As shown in FIG. 1, the input frames are denoted by $F_{t+Lf}$, wherein t is a variable refers to the index of the video fame. The output frames are denoted by $F'_t$, so that the delay in processing time of L has been considered. The length of the sliding window (in frames) is $L*f$. When L is set to L=0, it means that the real-time processing is required and thus no latency between input and output would exist.

As shown in FIG. 1, the video frames in the frame buffer 102 are processed simultaneously by two passes. First, the moving objects in the video are detected via the object detection and tracking module 104, then the detected objects are going through a face recognition process in the object identification module 106 to determine whether the object is a family member, a member requests privacy, or an intruder. At the same time, the objects go through the skin area detection module 108 to determine the nakedness level of the object. After that, the object visible engine 112 determines how much of the object will be displayed in the final video output.

The second pass, as shown in FIG. 1, describes that the instance segmentation process is first conducted on the video by the instance segmentation module 110 to parse out all the moving objects. Then based on the visibility recommendation of the object visible engine 112 for each object, the object removal and inpainting module 114 may remove some of the objects and use inpainting technology to fill the spaces using background or compensated patches from its neighbor video frames.

The video output may have objects that may fall into the following three categories. First, the object visible engine 112 may recommend a full appearance, thus the original object will appear and the object removal and inpainting module 114 may be bypassed. Second, the object visible engine 112 may recommend a fully invisible appearance, thus the object will be removed from the video, and the inpainting technology will apply to fill the space. Third, the object visible engine 112 may recommend as a partial invisible appearance, thus partial of the object will be removed from the video, and the inpainting technology will apply to fill the space.

In some embodiments, the length of the latency L may be designed or chosen based on the privacy protecting level or the security level of the privacy preservation processing. For example, when a high privacy protecting level is required, a complicated calculation to the video stream may be needed and therefore a long latency L to complete the calculation may be required. For another example, when a high security level is required, which means most portion of the input video may be output to the user, the calculation to the video stream may be simplified and therefore only a short latency L may be required to complete the calculation.

In some embodiments, the frame buffer 102 is a latency mechanism to allow the video output to run with a delay of the video input with a pre-assigned latency so that the system may look ahead in determining the object identification and privacy sensitivity for each moving object. The frame buffer 102 is utilized in the present disclosure so that the sliding window approach may be used for the object-level processing, which is based on the past frames stored in the frame buffer 102. The frame buffer 102 may enable the latency L, which allows the system to use this latency L to make a decision on every moving object and determines its classification for handling, which is explained in detail below in the object visible engine 112.

In some embodiments, the object detection and tracking module 104 and the object identification module 106 may be included in the privacy reserving camera to transform the camera processing from original frame-level to object-level.

Figure 2:
FIG. 2 illustrates a detected and tracked moving objects example consistent with various disclosed embodiments.

FIG. 2 illustrates a detected and tracked moving objects example consistent with various disclosed embodiments. In some embodiments, the object detection and tracking module 104 may detect a moving object and track this moving object through a video clip. The video input may typically be a few consecutive video frames and the video output may be a number of bounding boxes of objects and the classes of the objects (e.g., human face, human body, dog, etc.). As shown in FIG. 2, the human face and human body are tracked through the video clip.

Figure 3:
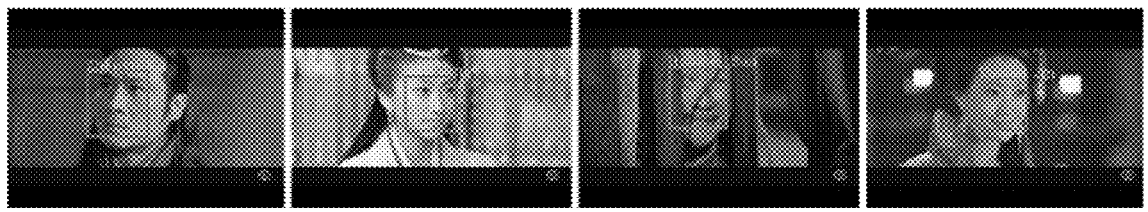
FIG. 3 illustrates an example of identifying different people in a video consistent with various disclosed embodiments.

The object identification module 106 may receive the bounding boxes of objects and output the recognized identity. FIG. 3 illustrates an example of identifying different people in a video consistent with various disclosed embodiments. As shown in FIG. 3, there are several ways to implement this functionality. In some embodiments, during an initial stage of system setup, the user may be asked to input photos of family members and specify who are privacy sensitive and who are not. When an intruder face is detected, the system may allow the user to specify the category of this person: a privacy sensitive family member or a normal family member, otherwise, it is an intruder that not needed to be memorized by the system. Therefore, during the object identification process, the object identification module 106 compares the detected object with the small database of pre-labelled object and make a decision on its identity.

For example, in FIG. 3, there are four images of different users' face recognized through the facial recognition process. The identity of these users may be input and stored in a database. When performing the facial recognition process, the recognized face may be compared with the stored information in the database to determine the identity of the recognized face. After the identity of the recognized face in the stream video is confirmed as a family member, a privacy sensitive member, or an intruder, the objective visible engine 112 may balance the security and privacy concerns in the logic described below. As an example. in the first frame of FIG. 3, the face of user A is recognized. The identity of the user, who is an actor, may be confirmed. The objective visible engine 112 may then determine how to process A's image based on the privacy settings associated with user A. As another example, in the second frame of FIG. 3, the face of user B is recognized. The identity of the user, who is a family member, may be confirmed. The objective visible engine 112 may then determine how to process B's image based on the privacy settings associated with user B. As a further example. in the third frame of FIG. 3, the face of user C is recognized. The identity of the users, who is a privacy preserving member, may be confirmed. The objective visible engine 112 may then determine how to process C's image based on the privacy settings associated with user C. As a further example, in the fourth frame of FIG. 3, the face of user D is recognized. The identity of the user, who is an intruder, may be confirmed. The objective visible engine 112 may then determine how to process D's image based on the privacy settings associated with user D.

The skin area detection module 108 may be applied to discover a scenario that a family member is not dressed (or half naked), which is sensitive for camera output. The skin area detection module 108 performs a skin area detection to the moving object to determine a nakedness level of the moving object. In some embodiments, a skin tone detection process may be used to determine the skin areas of an image. By simply measuring the percentage of the skin area within the object bounding box, the system may secure a rough estimation of skin appearance of the object. When the value is too high, certain action may need to take by the object visible engine 112.

Figure 4:
FIG. 4 illustrates an example of instance segmentation consistent with various disclosed embodiments.

The instance segmentation module 110 and the object removal and inpainting module 114 may be included in the present system to hide objects according to the privacy protection concern raised by the object visibility decision mechanism. FIG. 4 illustrates an example of instance segmentation consistent with various disclosed embodiments. The instance segmentation module 110 may generate segmentation mask for each object, as shown in FIG. 4. In FIG. 4, the area of each object is painted with a color mask, therefore the process of removing an object may simply cut the associated area and fill the space with inpainting technology.

As shown in FIG. 4, after the object is identified, the object may be marked by a boundary mask. When multiple objects show in the stream video simultaneously, multiple masks may be used to mark these objects at the same time by using multiple masks. In some embodiments, the object may be parsed and marked by the mask partially. In other embodiments, the object may be parsed and marked by the mask completely. In some embodiments, the object belongs to different privacy preserving categories may be marked with different masks using different colors or different shadings. In some embodiments, the objects having different nakedness level detected by the skin area detection module 108 may be marked with different masks using different colors. In some embodiments, one video stream or one fame of images may include users with different privacy settings. After the masks are applied, the processed frame of image many include one or more of users with a full appearance, a partial appearance (with masks), or with images removed from the frame.

Figure 5:
FIG. 5 illustrates an example of object removal and inpainting consistent with various disclosed embodiments.

FIG. 5 illustrates an example of object removal and inpainting consistent with various disclosed embodiments. Once the instance segmentation is done by the instance segmentation module 110, the region that covers an object has been specified. Then, the object removal and inpainting module 114 may take care of removing the object, or portion of the object if specified, from the image and then fill in the space after the object or object portion is cut with pixels generated using inpainting technology. FIG. 5 shows an example demonstrating how an object may be removed from the image without being noticed. The object boundary shown in FIG. 5 is just to help to show the object being removed, and the object boundary may or may not be shown in a real application. It is important to realize that by not showing the boundary, which is quite trivia, the object being removed may be completely disappeared without noticing by the end users.

After the object have been removed, the removed area in the video stream may be filled with a compensated patch. In some embodiments, the compensated patch may be generated from obtaining the same area from a neighbor frame. In some embodiments, the compensated patch may be generated from obtaining the background of the current frame of the video stream.

The object visible engine 112 may use a look ahead mechanism as well as an object identity and object nakedness level in the sliding window to form a decision on whether to allow the object to appear, or partially appear.

The object visible engine 112 may be used to balance the security and privacy concerns in the logic of determining what to expose and what to hide during the camera final output. When processing the frame $F_t$, we have the advantage of looking ahead to see frames $F_{t+1}, F_{t+2}, \ldots, F_{t+Lf}$, wherein the frames are stored in the frame buffer 102, so that the knowledge of future frames may be utilized during the object detection and tracking module 104 and the object identification module 106 mentioned above. When the index of objects tracked in the slide window frames (m=1, 2, . . . M) is denote by m, these objects may have different starting and ending time in the video sequence.

When the indicator of whether $O_m$ is detected as in $F_t$ is denote by $P(O_m, F_t)$, and whether $O_m$ is recognized as a privacy-sensitive family member, we to may obtain:

$$P(O_m, F_t) = \begin{cases} 0 & \text{if } O_m \text{ is a privacy-sensitive family member} \\ 1 & \text{otherwise} \end{cases} \quad (2)$$

When the indicator of whether $O_m$ is detected as in $F_t$ is denote by $N(O_m, F_t)$, and whether the percentage of the skin areas in the object is above a pre-set threshold, that is the object is treated as excessive naked, thus we may obtain:

$$N(O_m, F_t) = \begin{cases} 0 & \text{if } O_m \text{ is excessive naked} \\ 1 & \text{otherwise} \end{cases} \quad (3)$$

Therefore, by examining each of the tracked object, the visibility of the object may be determined as follows:

If $\Sigma_{q=t}^{t+L f} P(O_m, F_q) \geq 1$, then this object is invisible in the output frame $F'_t$;

If $\Sigma_{q=t}^{t+L f} N(O_m, F_q) \geq 1$, then this object is partial visible (only leave the face region visible) in the output frame $F'_t$;

Otherwise, the object is fully visible in the output frame $F'_t$.

The object removal and inpainting module 114 may follow the decision made by the condition above to output the object in the desirable way.

Figure 6:
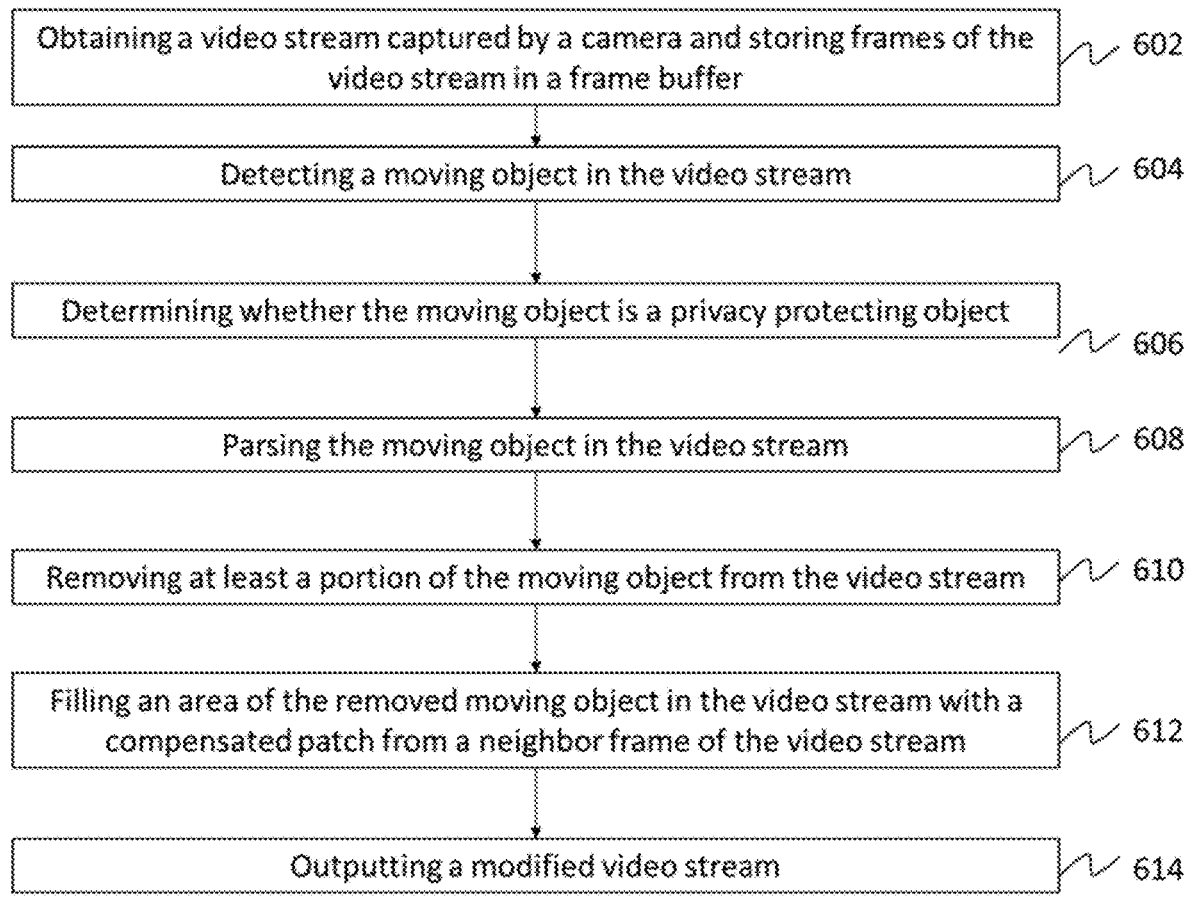
FIG. 6 illustrates a flow chart of an exemplary method for privacy preserving consistent with various disclosed embodiments.

The present disclosure further provides a method for privacy preserving. FIG. 6 illustrates a flow chart of an exemplary method for privacy preserving consistent with various disclosed embodiments. As shown in FIG. 6, the method for privacy preserving includes: obtaining a video stream captured by a camera and storing frames of the video stream in a frame buffer (Step 602); detecting a moving object in the video stream (Step 604); determining whether the moving object is a predefined privacy protecting object (Step 606); parsing the moving object in the video stream (Step 608); removing at least a portion of the moving object from the video stream (Step 610); filling an area of the removed moving object in the video stream with a compensated patch from a neighbor frame of the video stream (Step 612); and outputting a modified video stream having at least a portion of the moving object removed and filled with the compensated patch (Step 614).

The input video stream captured by the camera, after the image processing pipeline, enters the frame buffer, which enables the processing of the video frames, based on the history frames up to the size of the buffer, and enables a delayed output video stream. The frame buffer may enable a latency L, which allows the system to use this latency L to make a decision on every moving object and determines its classification for handling. The latency L between video input and video output in seconds. When denoting the size of the frame buffer 102 in frames is B, and the frame rate per second is f, we may find:

$$B >= L * f, \quad (1)$$

where B is a system constraint, and L is a customizable variable set by user. The system may control both B and L at reasonable small values, however, the larger L enables better accuracy of the system, as the object detection and tracking process and the object identification process have a longer sliding window to process the potential moving objects.

The input frames are denoted by $F_{t+Lf}$, wherein t is a variable refers to the index of the video fame, and the output frames are denoted by $F'_t$, so that the delay in processing time of L has been considered, and the length of the sliding window (in frames) is $L*f$. When L is set to L=0, it means that the real-time processing is required and thus no latency between input and output is allowed.

The video frames in the frame buffer are processed simultaneously by two passes. First, the moving objects in the video are detected by the object detection and tracking process, then the detected objects are going through an object identification process 606, or a face recognition process, to determine whether the object is a normal family member, a member requests privacy, or an intruder. At the same time, the objects go through the skin area detection process to determine the nakedness level of the object. After that, an object visible engine may determine how much of the object will be displayed in the final video output.

The second pass describes that the instance segmentation process 608 is first conducted on the video to parse out all the moving objects. Then based on the visibility recommendation of the object visible engine for each object, the object removal and inpainting process 610 may remove some of the objects and use inpainting process 612 to fill the spaces using background or compensated patches from its neighbor video frames.

The video output may have objects that fall into the following three categories. First, the object visible engine may recommend a full appearance, thus the original object will appear and the object removal and inpainting process 610 and 612 may be bypassed. Second, the object visible engine may recommend a fully invisible appearance, thus the object will be removed from the video in step 610, and the inpainting process 612 will apply to fill the space. Third, the object visible engine may recommend a partial invisible appearance, thus partial of the object will be removed from the video, and the inpainting process 612 will apply to fill the space.

In some embodiments, the frame buffer is a latency mechanism to allow the video output running with a delay of the video input with a pre-assigned latency so that the system may look ahead in determining the object identification and privacy sensitivity for each moving object. The frame buffer is utilized in the present disclosure so that the sliding window approach may be used for the object-level processing, which is based on the past frames stored in the frame buffer. The frame buffer may enable the latency L, which allows the system to use this latency L to make a decision on every moving object and determines its classification for handling.

In some embodiments, the object detection and tracking process 604 and the object identification process 606 may be included in the method for privacy preserving to transform the camera processing from original frame-level to object-level.

The object detection and tracking process 604 may comprises detecting a moving object in the video stream. In some embodiments, the object detection and tracking process 604 may detect a moving object and track this moving object through a video clip. The video input may typically be a few consecutive video frames and the video output may be a number of bounding boxes of objects and the classes of the objects (e.g., human face, human body, dog, etc.).

The object identification process 606 comprises determining whether the moving object is a predefined privacy protecting object. When the moving object is determined not the predefined privacy protecting object, the video stream may be output. When the moving object is determined as the predefined privacy protecting object, an instance segmentation process 608 may be applied thereafter.

The object identification process 606 may receive the bounding boxes of objects and output the recognized identity. There are several ways to implement this functionality. In some embodiments, during an initial stage of system setup, the user may be asked to input photos of family members and specify who are privacy sensitive and who are not. When an intruder face is detected, the system may allow the user to specify the category of this person: a privacy sensitive family member or a normal family member, otherwise, it is an intruder that not needed to be memorized by the system. Therefore, during the object identification process, the detected object is compared with the database of pre-labelled object and make a decision on its identity.

A skin area detection process may be applied to discover a scenario that a family member is naked (or half naked), which is sensitive for camera output. In some embodiments, a skin tone detection process may be used to determine the skin areas of an image. By simply measuring the percentage of the skin area within the object bounding box, the system may secure a rough estimation of skin appearance of the object. When the value is too high, certain action may need to take by the object visible engine.

The instance segmentation process 608, the object removal process 610 and the inpainting process 612 may be included in the present system to hide objects according to the privacy protection concern raised by the object visibility decision mechanism. The instance segmentation process 608 comprises segmenting the moving object in the video stream. The instance segmentation process 608 may generate segmentation mask for each object. For example, the area of each object is painted with a color mask, therefore the process of removing an object may simply cut the associated area and fill the space with inpainting technology.

Once the instance segmentation is done, the region that covers an object has been specified. Then, the object removal process 610 may take care of removal object, or portion of the object if specified, from the image and then the inpainting process 612 may fill in the space after the object or object portion is cut with pixels generated using inpainting technology. The object removal process 610 comprises removing at least a portion of the moving object from the video stream, and the inpainting process 612 comprises filling an area of the removed moving object in the video stream with a compensated patch from a neighbor frame of the video stream.

The object visible engine may use a look ahead mechanism as well as an object identity and object nakedness level in the sliding window to form a decision on whether to allow the object to appear, or partially appear.

The object visible engine may be used to balance the security and privacy concerns in the logic of determining what to expose and what to hide during the camera final output. When processing the frame $F_t$, we have the advantage of looking ahead to see frames $F_{t+1}, F_{t+2}, \ldots, F_{t+Lf}$, wherein the frames are stored in the frame buffer, so that the knowledge of future frames may be utilized during the object detection and tracking process 604 and the object identification process 606 mentioned above. When the index of objects tracked in the slide window frames (m=1, 2, ... M) is denote by m, these objects may have different starting and ending time in the video sequence.

When the indicator of whether $O_m$ is detected as in $F_t$ is denote by $P(O_m, F_t)$, and whether $O_m$ is recognized as a privacy-sensitive family member, we may obtain:

$$P(O_m, F_t) = \begin{cases} 0 & \text{if } O_m \text{ is a privacy-sensitive family member} \\ 1 & \text{otherwise} \end{cases} \quad (2)$$

When the indicator of whether $O_m$ is detected as in $F_t$ is denote by $N(O_m, F_t)$, and whether the percentage of the skin areas in the object is above a pre-set threshold, that is the object is treated as excessive naked, thus we may obtain:

$$N(O_m, F_t) = \begin{cases} 0 & \text{if } O_m \text{ is excessive naked} \\ 1 & \text{otherwise} \end{cases} \quad (3)$$

Therefore, by examining each of the tracked object, the visibility of the object may be determined as follows:

If $\Sigma_{q=t}^{t+Lf} P(O_m, F_q) \geq 1$, then this object is invisible in the output frame $F'_t$;

If $\Sigma_{q=t}^{t+Lf} N(O_m, F_q) \geq 1$, then this object is partial visible (only leave the face region visible) in the output frame $F'_t$;

Otherwise, the object is fully visible in the output frame $F'_t$.

The object removal process 610 and the inpainting process 612 may follow the decision made by the condition above to output the object in the desirable way.

The present disclosure further provides a non-transitory computer readable medium storing executable computer program instructions for privacy preserving. The computer program instructions comprise instructions for applying the privacy preserving method described above, such as: obtaining a video stream captured by a camera and storing frames of the video stream in a frame buffer; detecting a moving object in the video stream; determining whether the moving object is a predefined privacy protecting object; parsing the moving object in the video stream; removing at least a portion of the moving object from the video stream; filling an area of the removed moving object in the video stream with a compensated patch from a neighbor frame of the video stream; and outputting a modified video stream having at least a portion of the moving object removed and filled with the compensated patch (e.g., masking).

The present disclosure proposes a privacy preserving camera and a privacy preserving method. The user may specify which family members are privacy sensitive, so that he/she will not be recorded in the final video output. Under this application, the privacy of these members is protected. On the other hand, the other members and intruders are still recorded in the final video output, thus the security capability is still maintained.

Embodiments of the present disclosure may be used in smart homes to monitor people movement and activities, in public venues for security monitoring, and in semi-public spaces such as office spaces. For example, in a high security building, the privacy preserving camera system may be used as a security surveillance camera. The preserving camera system may be used to partially mask or completely mask from the video stream certain persons who should not be tracked. In another example, the privacy preserving camera system may be used in conjunction with a camera system with no privacy settings. The privacy preserving camera system may partially mask or completely mask from the video stream certain persons. When there is a need to track down certain activities, the un-processed video stream may be checked to further identify the relevant person movements in the video stream. Depending on the security concerns, the video stream with privacy preserving settings and/or the unprocessed video streams may be stored for future use.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A privacy preserving camera, comprising:
   a frame buffer storing frames of a video stream captured by the privacy preserving camera;
   a memory storing computer-executable instructions; and
   a processor, when executing the computer-executable instructions stored in the memory, configured to perform:
   detecting a moving object in the video stream;
   determining whether the moving object is a privacy protecting object, wherein when the moving object is determined not to be the privacy protecting object, outputting the video stream;
   parsing the moving object in the video stream when the moving object is determined as the privacy protecting object;
   removing at least a portion of the moving object from the video stream, filling an area of the removed moving object in the video stream with a compensated patch from a neighbor frame or a background of a current frame of the video stream, and outputting a modified video stream having at least a portion of the moving object replaced with the compensated patch;
   performing a skin area detection to the moving object to determine a nakedness level of the moving object;
   determining an identity of the moving object; and
   determining whether to allow a first frame at a first time instance of the moving object to appear according to the object identity of the moving object in a second frame at a second time instance and the nakedness level of the moving object in the second frame at the second time instance, the second time instance being a later time instance of the first time instance.

2. The privacy preserving camera according to claim 1, wherein the processor is further configured to perform:
   detecting the moving object and tracking the moving object through a video clip; and
   outputting a number of bounding boxes of the moving object and a class of the moving object.

3. The privacy preserving camera according to claim 1, wherein the processor is further configured to:
   perform a face recognition process to determine whether the moving object is a family member, a privacy requesting member, or an intruder.

4. The privacy preserving camera according to claim 3, wherein the processor is further configured to perform:
   inputting photos of the family member and the privacy requesting member in an initial stage;
   comparing the detected moving object with a database of the input photos of the family member and the privacy requesting member to confirm an identity of the moving object.

5. The privacy preserving camera according to claim 1, wherein the processor is further configured to perform:
   generating a segmentation mask for the moving object; and
   painting an area of the generated segmentation mask with a color mask.

6. A method for privacy preserving comprising:
   obtaining a video stream captured by a camera and storing frames of the video stream in a frame buffer;
   detecting a moving object in the video stream;
   determining whether the moving object is a privacy protecting object;
   when the moving object is determined not to be the privacy protecting object, outputting the video stream;
   when the moving object is determined as the privacy protecting object:
   parsing the moving object in the video stream;
   removing at least a portion of the moving object from the video stream;
   filling an area of the removed moving object in the video stream with a compensated patch from a neighbor frame or a background of a current frame of the video stream;
   outputting a modified video stream having at least a portion of the moving object replaced with the compensated patch;
   performing a skin area detection to the moving object to determine a nakedness level of the moving object;
   determining an identity of the moving object; and
   determining whether to allow a first frame at a first time instance of the moving object to appear according to the object identity of the moving object in a second frame at a second time instance and the nakedness level of the moving object in the second frame at the second time instance, the second time instance being a later time instance of the first time instance.

7. The method according to claim 6, wherein the detecting a moving object in the video stream, further comprises:
   detecting the moving object and tracking the moving object through a video clip;
   and outputting a number of bounding boxes of the moving object and a class of the moving object.

8. The method according to claim 6, wherein the determining whether the moving object is the privacy protecting object, further comprises:
   performing a face recognition process to determine whether the moving object is a family member, a privacy requesting member, or an intruder.

9. The method according to claim 8, wherein the determining whether the moving object is the privacy protecting object, further comprises:
   inputting photos of the family member and the privacy requesting member in an initial stage;
   comparing the detected moving object with a database of the input photos of the family member and the privacy requesting member to confirm an identity of the moving object.

10. The method according to claim 6,
    wherein performing the skin area detection includes determining a skin area of an image of the moving object using a skin tone detection process.

11. The method according to claim 6, wherein the parsing the moving object in the video stream, further comprising:

generating a segmentation mask for the moving object; and painting an area of the generated segmentation mask with a color mask.

12. A non-transitory computer readable medium storing executable computer program instructions for privacy preserving, the computer program instructions comprising instructions for:

obtaining a video stream captured by a camera and storing frames of the video stream in a frame buffer;

detecting a moving object in the video stream;

determining whether the moving object is a privacy protecting object;

when the moving object is determined not to be the privacy protecting object, outputting the video stream;

when the moving object is determined as the privacy protecting object:

parsing the moving object in the video stream;

removing at least a portion of the moving object from the video stream;

filling an area of the removed moving object in the video stream with a compensated patch from a neighbor frame or a background of a current frame of the video stream;

outputting a modified video stream having at least a portion of the moving object replaced with the compensated patch;

performing a skin area detection to the moving object to determine a nakedness level of the moving object;

determining an identity of the moving object; and determining whether to allow a first frame at a first time instance of the moving object to appear according to the object identity of the moving object in a second frame at a second time instance and the nakedness level of the moving object in the second frame at the second time instance, the second time instance being a later time instance of the first time instance.

13. The non-transitory computer readable medium according to claim 12, wherein the detecting a moving object in the video stream, further comprises:

detecting the moving object and tracking the moving object through a video clip;

and outputting a number of bounding boxes of the moving object and a class of the moving object.

14. The non-transitory computer readable medium according to claim 12, wherein the determining whether the moving object is the privacy protecting object, further comprises:

performing a face recognition process to determine whether the moving object is a family member, a privacy requesting member, or an intruder.

15. The non-transitory computer readable medium according to claim 14, wherein the determining whether the moving object is the privacy protecting object, further comprises:

inputting photos of the family member and the privacy requesting member in an initial stage;

comparing the detected moving object with a database of the input photos of the family member and the privacy requesting member to confirm an identity of the moving object.

16. The non-transitory computer readable medium according to claim 12, wherein performing the skin area detection includes determining a skin area of an image of the moving object using a skin tone detection process.

17. The non-transitory computer readable medium according to claim 12, wherein the parsing the moving object in the video stream, further comprising:

generating a segmentation mask for the moving object; and painting an area of the generated segmentation mask with a color mask.

\* \* \* \* \*